(12) United States Patent
Sarwar et al.

(10) Patent No.: US 12,556,376 B2
(45) Date of Patent: Feb. 17, 2026

(54) L1 ENCRYPTION OF OPENZR+ FRAMED OPTICAL TRANSPORT

(71) Applicant: 1FINITY Inc., Kawasaki (JP)

(72) Inventors: Muhammad S. Sarwar, Easton, CT (US); Junichi Sugiyama, Kawasaki (JP)

(73) Assignee: 1FINITY Inc., Kawasaki (JP)

( * ) Notice: Subject to any disclaimer, the term of this patent is extended or adjusted under 35 U.S.C. 154(b) by 176 days.

(21) Appl. No.: 18/103,485

(22) Filed: Jan. 30, 2023

(65) Prior Publication Data
US 2024/0259189 A1 Aug. 1, 2024

(51) Int. Cl.
*H04L 9/08* (2006.01)
*H04L 9/06* (2006.01)

(52) U.S. Cl.
CPC .......... *H04L 9/0825* (2013.01); *H04L 9/0631* (2013.01)

(58) Field of Classification Search
CPC ............................ H04L 9/0825; H04L 9/0631
See application file for complete search history.

(56) References Cited

U.S. PATENT DOCUMENTS

| | | | | |
|---|---|---|---|---|
| 10,567,352 | B2 * | 2/2020 | Gareau | H04L 1/0002 |
| 11,184,112 | B1 * | 11/2021 | Gareau | H04L 1/0071 |
| 2002/0126685 | A1 * | 9/2002 | Leatherbury | H04N 21/6118 370/480 |
| 2005/0254656 | A1 * | 11/2005 | Rose | H04L 63/0428 380/277 |
| 2008/0270785 | A1 * | 10/2008 | Loprieno | H04L 9/0838 713/150 |
| 2015/0082337 | A1 * | 3/2015 | Mamidwar | H04N 21/23895 725/31 |
| 2019/0173856 | A1 * | 6/2019 | Gareau | H04L 9/3215 |
| 2023/0031796 | A1 * | 2/2023 | Gareau | H04B 10/40 |

* cited by examiner

*Primary Examiner* — Pramila Parthasarathy
(74) *Attorney, Agent, or Firm* — Maschoff Brennan

(57) ABSTRACT

According to an aspect of an embodiment, operations may include receiving an Ethernet signal. The operations may further include creating a bitstream from the Ethernet signal which may include a payload of client information and a set of padding bits. The operations may also include encrypting, using an encryption scheme with an encryption key for a set number of bits, a total payload wherein the total payload may include a combination of the payload of client information and at least one bit from the set of padding bits such that the total payload is divisible by the set number of bits. Further, the operations may include generating a frame from the bitstream which may include the total payload.

18 Claims, 8 Drawing Sheets

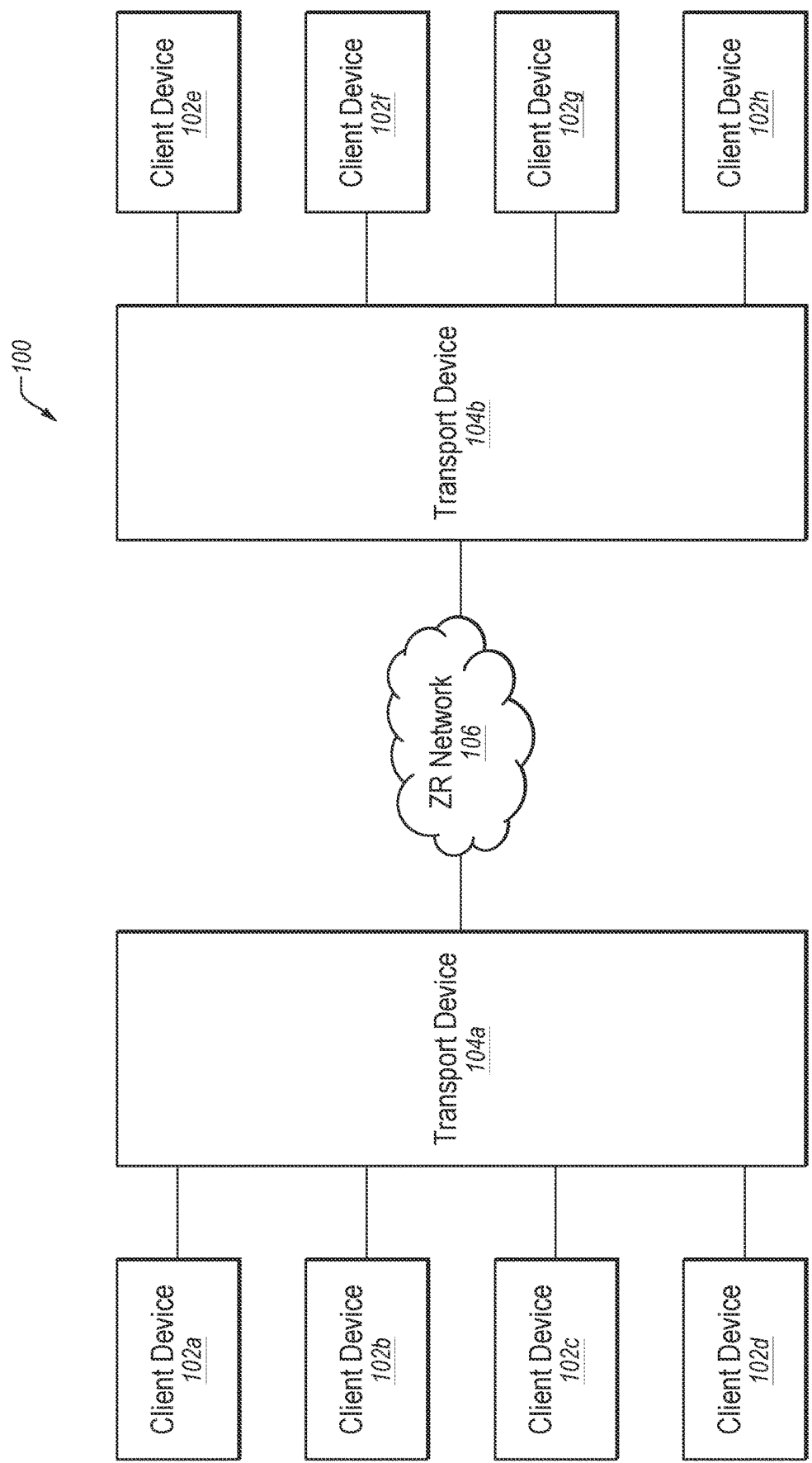

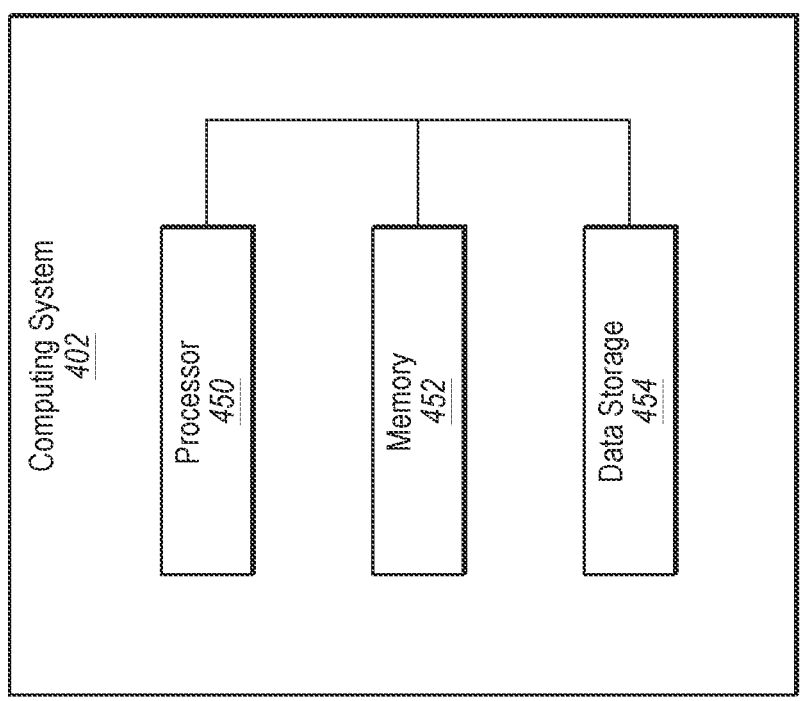

L1 ENCRYPTION OF OPENZR+ FRAMED OPTICAL TRANSPORT

FIELD

The embodiments discussed herein are related to encryption of optical signals including, for example, 400G ZR, OpenZR optical signals, and OpenZR+ optical signals.

BACKGROUND

Telecommunications systems, cable television systems and data communication networks use optical networks to convey information between remote points. In an optical network, information is conveyed in the form of optical signals through optical fibers or other optical media.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may include receiving an Ethernet signal. The operations may also include creating a bitstream from the Ethernet signal including a payload of client information and a set of padding bits. In addition, the operations may further include encrypting, using an encryption scheme with an encryption key for a set number of bits, a total payload wherein the total payload includes a combination of the payload of client information and at least one bit from the set of padding bits such that the total payload is divisible by the set number of bits. Further, the operations may include generating a frame from the bitstream comprising the total payload.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 1A illustrates an example embodiment of an optical system configured to perform encryption of ZR signals;

FIG. 4 illustrates a block diagram of an example computing system, all arranged in accordance with some embodiments of the present disclosure.

DESCRIPTION OF EMBODIMENTS

Figure 1B:
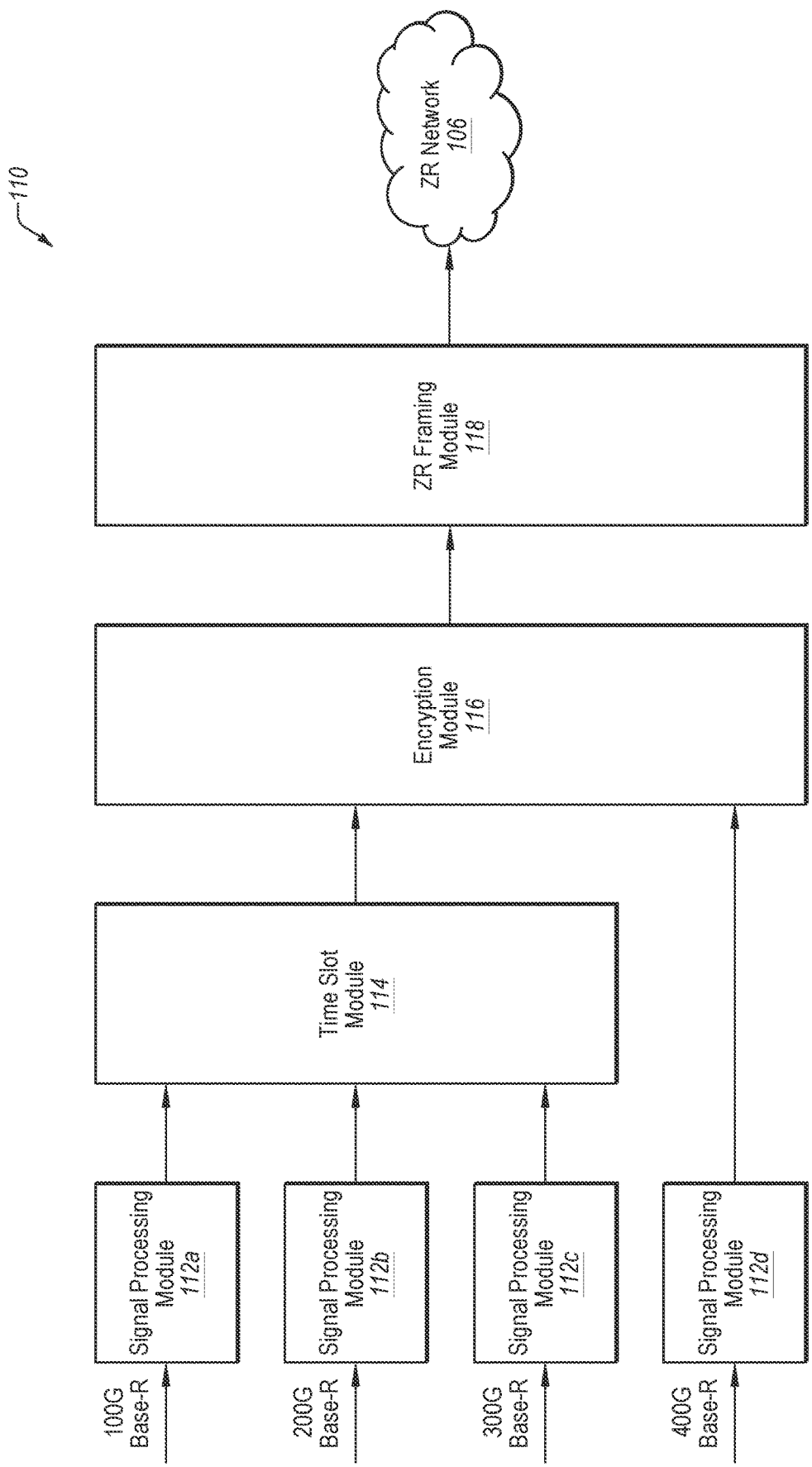
FIG. 1B illustrates a system configured to perform encryption operations.

Optical networks are increasingly carrying more and more data such that different implementation agreements are being implemented to support high bandwidth transmission of data via optical networks. Further, the implementation agreements help carriers to mix and match coherent interfaces from different vendors across their respective networks.

A family of multiple long range (ZR) implementation agreements have been developed to define interoperable coherent interfaces for use with long range (e.g., 120 km) point-to-point data links. For example, 400ZR defined by OIF Implementation Agreement (IA) is a 400 Gigabit (400G) coherent interface for use with point-to-point data links up to 120 km, using ZR framing structure, as defined in the IA. Further, the Open ZR+ interoperability agreement relates to a potential range of solutions or operating modes for coherent solutions that may be outside of 400ZR. Open ZR+ is another agreement that focuses on optical specifications capable of flexible 100G-400G line rates and longer optical reaches than 400ZR. For example, Open ZR+ provides interoperable 100G, 200G, 300G, and 400G line rates over metro, regional, and long-haul distances, based on a new frame structure utilizing OpenFEC (oFEC) forward error correction and a set of 100-400G optical line specifications. OpenZR+ framing is based on a 400GZR framing format that has been extended to additional supported rates. ZR+ signal is a vendor specific implementation that may or may not be based on 400GZR framing structure. In the present disclosure generic reference to "ZR" type signals, data rates, components, networks, etc. may refer to any signal, data rate, component, network, etc., that may be configured to operate within the specifications provided by any ZR type implementation agreement including, ZR, ZR+, Open ZR+, etc. operating at any rate including rates lower and higher than 400G.

As detailed below, one or more embodiments of the present disclosure relate to the encryption of signals transmitted using an Open ZR+ interoperability agreement (e.g., a 400G Open ZR+ interoperability agreement). In some embodiments, the Open ZR+ protocol may be such that the number of data bits included in the payload of a data frame configured according to the Open ZR+ protocol (referred to as "ZR frames") may not easily lend itself to some encryption schemes. For example, a particular encryption scheme that may be desired to apply to the ZR frames may be a 256-bit encryption scheme such that the size of each encryption block may be 256 bits. As such, the number of bits to encrypt may need to be divisible by 256. However, the size of the payload area of the ZR frames may not be a number that is divisible by 256.

According to one or more embodiments of the present disclosure, one or more padding bits that are included in ZR frames between an overhead area and a payload area of the ZR frames may be included with the encryption of the data bits of the payload in order to make the total number of encrypted bits divisible by the set number of bits associated with a particular encryption scheme. Further, the encryption may be such that the data bits may be encrypted in encryption blocks having a size that corresponds to the particular encryption scheme. The encryption described according to the present disclosure may also be such that the individual encryption blocks may each include data associated with a single client signal such that the data of the different signals may be encrypted separately. That is, the data of the client signals may be encrypted and secured before being packaged and transmitted to a ZR network. Moreover, the data of the client signals may be encrypted separately regardless of the communicated signal's data rate. For example, this encryption scheme may be implemented on client signals communicated at various data rates including, 100G, 200G, 300G, 400G, and beyond. The encryption scheme is therefore able to encrypt and decrypt the data of client signals separately while also transporting the encrypted signals together in accordance with an interoperability agreement, for example, an Open ZR+ interoperability agreement. In the present disclosure, reference to encrypting or decrypting a client signal may refer to encrypting or decrypting the data of a client signal.

Embodiments of the present disclosure will be explained with reference to the accompanying drawings.

FIG. 1A illustrates an example embodiment of an optical system 100 ("system 100") configured to perform encryption of ZR signals, according to one or more embodiments of the present disclosure. The system 100 may include a client device 102a, a client device 102b, a client device 102c, a client device 102d, a client device 102e, a client device 102f, a client device 102g, and a client device 102h (referred to generally as "client devices 102"). Further, the system 100 may include a transport device 104a and a transport device 104b (referred to generally as "transport devices 104"). In addition, the system 100 may include a ZR network 106 (e.g., a ZR framed optical transmission network).

The client devices 102 may include any suitable system, apparatus, or device, configured to direct the communication of a client optical Ethernet signal. For example, in some embodiments, each of one or more of the client devices 102 may be a router configured to direct the communication of an optical Ethernet signal. For instance, the optical Ethernet signals that may be directed and communicated by the client devices may include a 100G signal, a 200G signal, a 300G signal, or a 400G signal. In these and other embodiments, the optical Ethernet signals detailed are illustrative and embodiments described herein may be configured to include signals with a data rate exceeding 400G; for example, an 800G Ethernet signal. The client devices 102 may include any suitable arrangement of electrical, optical, and/or electro-optical components and hardware configured to perform the operations described. Further, the client devices 102 may include any suitable computing system such as the computing system described below with respect to FIG. 4.

In some embodiments, the client devices 102a-d may be configured to direct signals that are to be communicated via the ZR network 106. Additionally or alternatively, the client devices 102e-h may be configured to receive signals that have been communicated via the ZR network 106 and may direct such signals to other elements. The Ethernet signals that are communicated by the client devices 102 may be referred to as "client signals."

Each of the client devices 102 may include any suitable system, apparatus, or device, configured to direct the communication of client signals of various data rates. For example, a client device 102a may include a suitable system to transmit a 100G signal, client device 102b may include a suitable system to transmit a 200G signal, client device 102c may include a suitable system to transmit a 300G signal, and client device 102d may include a suitable system capable of transmitting a 400G signal. In some embodiments, each of the client devices 102 may include a suitable system capable of transmitting a signal exceeding a 400G data rate. Additionally or alternatively, each of the client devices 102 may include any suitable system, apparatus, or device, configured to direct the communication of client signals with the same data rate. For example, each of the client devices 102 may include any suitable device configured to transmit 400G or higher rate signals.

The transport devices 104 may include any suitable system, apparatus, or device configured to receive client signals from client devices 102 and communicate those client signals to the ZR network 106. For example, in some embodiments, the transport devices 104 may include any suitable arrangement of electrical, optical, and/or electro-optical components configured to perform the operations described. Further, the transport devices 104 may include any suitable computing system such as the computing system described below with respect to FIG. 4.

In some embodiments, the transport devices 104 may be configured to receive client signals from the client devices 102 and generate ZR signals based on the client signals. The transport devices 104 may also be configured to provide the generated ZR signals to the ZR network 106 for communication via the ZR network 106. Reference to "ZR signals" in the present disclosure may relate to any suitable optical signal that may be communicated according to any applicable ZR operating agreement including, for example, an Open ZR+ interoperability agreement.

In some embodiments, the ZR signals generated and transmitted to the ZR network 106 by transport devices 104 are a product of packaging the data of various client signals together for transmission. For example, client device 102a may be configured to transmit a client signal at a data rate of 100G, client device 102b may be configured to transmit a separate client signal at a data rate of 200G, client device 102c may be configured to transmit another separate client signal at a data rate of 300G, and client device 102d may be configured to transmit another separate client signal at a data rate of 400G. Transport device 104a may be configured to receive each of the signals from client devices 102a-d, package the data of the received client signals into a payload of a ZR frame, and transmit the ZR frame via a ZR signal to the ZR network 106 for communication to the transport device 104b.

Additionally or alternatively, the transport device 104b may be configured to receive ZR frames via ZR signals that are communicated via the ZR network 106. In these or other embodiments, the transport device 104b may be configured to unpack the ZR frames received via the ZR signal communicated via the ZR network 106. Furthermore, the transport device 104b may be configured to unpack client data from the payload of the ZR frame such that the respective client data can be communicated to respective client devices 102e-h.

In some embodiments, as detailed below, the transport device 104a may be configured to encrypt the data of each of the client signals received from client devices 102a-d. For example, client devices 102a-d may each be configured to transmit a respective client signal from a respective client. The transport device 104a may be configured to encrypt the data of each client signal separately prior to packaging the data of the client signals into a payload of a ZR frame together. Additionally or alternatively, the transport device 104a may be configured to encrypt the data of each client signal separately and package the data of each respective client signal into a respective payload of a respective ZR frame. The transport device 104a may then be configured to transmit each ZR frame via a ZR signal to the ZR network 106 for communication to the transport device 104*b*.

In some embodiments, the transport device 104*b* may be configured to receive ZR signals that are communicated via the ZR network 106 and decrypt the client data from each of the respective payloads in each of the respective ZR frames. In these and other embodiments, transport device 104*b* may be configured to communicate the respective decrypted client data to respective client devices 102*e-h*.

The ZR network 106 may be any suitable optical network configured to communicate signals according to any applicable ZR based operating agreement. For example, the ZR network 106 may be a ZR framed optical transmission network. In some embodiments, the ZR network 106 may be configured to communicate signals according to the Open ZR+ based operating agreement. In some embodiments, the ZR network 106 may include different transmission rates, modulation schemes, baud, rates, distances, etc., that may be related to communication of optical signals according to a ZR operating agreement. For instance, the transmission rates may include 100G, 200G, 300G, 400G, 800G, etc. The modulation formats may include any suitable modulation scheme that may be used to encode the information including any suitable polarization multiplexed or dual-polarization modulation scheme. For example, the modulation schemes may include a dual-polarization (DP) modulation scheme that may include a dual-polarization quadrature phase-shift keying (DP-QPSK) modulation scheme, a DP-8PSK modulation scheme, a DP-16PSK modulation scheme, or any applicable dual-polarization quadrature amplitude modulation (DP-QAM) scheme (e.g., DP-QAM, DP-8QAM, DP-16QAM, etc.). The baud rate may include 32 Gbaud, 60 Gbaud, 64 Gbaud, or higher. The distances may include ranges from 50 km to over 3000 km.

The ZR network 106 may include a point-to-point optical network with terminal nodes, a ring optical network, a mesh optical network, or any other suitable optical network or combination of optical networks. For example, the optical network may include nodes that are configured to communicate information to each other via optical signals transmitted through optical fibers.

FIG. 1B illustrates a system 110 configured to perform encryption operations according to one or more embodiments of the present disclosure. The system 110 may be capable of performing encryption operations on data from one or more client signals from client devices 102, shown in FIG. 1A, to generate an encrypted bitstream.

FIG. 1B includes descriptions of various modules that may be configured to perform operations. One or more of the modules may include code and routines configured to enable a computing system to perform one or more operations described therewith. Additionally or alternatively, one or more of the modules may be implemented using hardware including a processor, a microprocessor (e.g., to perform or control performance of one or more operations), a field-programmable gate array (FPGA), or an application-specific integrated circuit (ASIC). In some other instances, one or more of the modules may be implemented using a combination of hardware and software. In the present disclosure, operations described as being performed by a respective module may include operations that the respective module may direct a corresponding system to perform. Further, although modules are described separately, such separation may be a logical separation to help facilitate the description of different operations that may be performed by the system of FIG. 1B. As such, particular implementations of the modules may be such that they are integrated into the same module or distributed in a different manner than illustrated or explained.

In the example of FIG. 1B, the system 110 may include a number of modules that may be configured to encrypt data from a first client signal transmitted from a first client device 102*a*, data from a second client signal transmitted from a second client device 102*b*, data from a third client signal transmitted from a third client device 102*c*, and data from a fourth client signal transmitted from a fourth client device 102*d*. In some embodiments, the first client signal may be a 100G signal, the second client signal may be a 200G signal, the third client signal may be a 300G signal, and the fourth client signal may be a 400G or higher rate signal. The client signals listed in FIG. 1B are illustrative; analogous encryption operations may be performed with respect to other applicable client signal combinations. Furthermore, the encryption operations performed by one or more of the modules in FIG. 1B on sub-400G client signals may also perform one or more of the operations described and illustrated in FIG. 1C.

The system 110 may be configured to perform client signal processing operations on the client signals containing client data. The client signal processing operations may be performed by the signal processing modules 112. For example, a signal processing module 112*a* may perform various signal processing operations on the first client signal with a data rate of 100G, a signal processing module 112*b* may perform signal processing operations on the second client signal with a data rate of 200G, a signal processing module 112*c* may perform signal processing operations on the third client signal with a data rate of 300G, and by a signal processing module 112*d* may perform signal processing operations on the fourth client signal with a data rate of 400G or higher.

In some embodiments, the signal processing module 112*a* may receive data from the first client signal. The signal processing module 112*a* may then employ data correction processes to decrease the number of errors and/or to decrease the amount of noise in the first client signal. The data correction processes may include any suitable error correction code (e.g., FEC ("Forward Error Correction")) wherein the FEC may allow the signal processing module 112*a* to detect various errors in the transmission. The FEC may also allow the signal processing module 112*a* to either request re-transmission of the first client signal or to correct the detected errors in the data of the first client signal. In some embodiments, the signal processing operations that may be performed by the signal processing modules 112 may include any suitable mapping procedure (e.g., GMP ("Generic Mapping Procedure")) that may, for example, map data from the client signals onto a bitstream.

In some embodiments, the mapped data from a client signal embodied by the bitstream may be compatible with an Open ZR+ operating agreement. The bitstream may include data from the client signal that may be aggregated into a payload of a ZR frame by the ZR framing module 118 (referred to hereinafter as "the payload") as described further below and a number of padding bits.

Additionally or alternatively, the signal processing modules 112 may be configured to transmit the bitstreams. For example, signal processing module 112*a* may be configured to transmit a bitstream mapped from the data of the first client signal to a time slot module 114, the signal processing module 112*b* may be configured to transmit a bitstream mapped from the data of the second client signal to the time slot module 114, the signal processing module 112*c* may be configured to transmit a bitstream mapped from the data of the third client signal to the time slot module 114, and the signal processing module 112d may be configured to transmit a bitstream mapped from the data of the fourth client signal to an encryption module 116.

The system 110 may also include a time slot module 114 configured to perform operations on data received from sub-400G client signals following the signal processing performed by signal processing modules 112a-c. For example, the time slot module 114 may receive a bitstream from signal processing module 112a which may be mapped from the data of the first client signal. The time slot module 114 may also receive a bitstream from signal processing module 112b which may be mapped from the data of the second client signal, and the time slot module 114 may additionally receive a bitstream from client signal processing module 112c which may be mapped from the data of the third client signal 112c.

In some embodiments, the time slot module 114 may package bitstreams together. For example, the time slot module may receive a first bitstream from the signal processing module 112a, a second bitstream from the signal processing module 112b, and a third bitstream from signal processing module 112c. The time slot module 114 may allocate a time slot for each of the respective bitstreams and the time slot module 114 may additionally package the bitstreams together using any suitable multiplexing method (e.g., TDM ("Time Division Multiplexing")). By allocating a respective time slot to each respective bitstream, each respective bitstream may remain independent while the respective bitstreams may also be transmitted together to, for example, an encryption module 116. As discussed in further detail below, allocating time slots for respective bitstreams may allow the encryption module 116 to isolate each respective bitstream, encrypt each respective bitstream, and re-insert each respective, encrypted bitstream back into its respective time slot. In some embodiments, the time slot module 114 may allow for efficient transmission of information and may also allow client data to be individually encrypted.

In these or other embodiments, the system 110 may include an encryption module 116 configured to encrypt the payload in each respective bitstream. The encryption module 116 may use any suitable form of encryption model (e.g., AES 256 ("Advanced Encryption Standard 256")). The encryption module 116 may use AES 256 to encrypt the payload in each respective bitstream in 256-bit segments.

In some embodiments, the encryption module 116 may use and encrypt a number of padding bits along with the payload in order to fully encrypt the payload received from the time slot module 114 or from the signal processing module 112d. For example, the signal processing module 112d may process a client signal that may have a 400G data rate. The signal processing module 112d may map the data from the client signal onto a bitstream that may include the payload and a number of padding bits. The signal processing module 112d may then transmit the bitstream to the encryption module 116. The encryption module 116 may then encrypt the payload received from the signal processing module 112d and may use an encryption model to encrypt the payload, for example, AES 256. The encryption module 116 may encrypt the payload in 256-bit segments. In order that the encryption module 116 may encrypt the payload in its entirety, the encryption module 116 may additionally encrypt a number of padding bits along with the payload such that the total number of encrypted bits may be a multiple of 256 bits.

Additionally or alternatively, as stated above, the encryption module 116 may receive a bitstream from the time slot module 114 that may contain various bitstreams in various time slots. For example, the time slot module 114 may allocate a first time slot for a first bitstream, a second time slot for a second bitstream, and a third time slot for a third bitstream. The encryption module 116 may separately encrypt the payload in the first bitstream in the first time slot, the payload in the second bitstream in the second time slot, and the payload in the third bitstream in the third time slot.

In some embodiments, the encryption module 116 may encrypt a number of padding bits along with the payload in order to fully encrypt the data from each respective client signal in each respective time slot such that the total number of encrypted bits in each bitstream may be a multiple of 256 bits. For example, the encryption module may receive a first bitstream that may have been allocated a first time slot, a second bitstream that may have been allocated a second time slot, and a third bitstream that may have been allocated a third time slot. The encryption module may use a first number of padding bits to encrypt the payload from a first client signal in the first bitstream, a second number of padding bits to encrypt the payload from a second client signal in the second bitstream, and a third number of padding bits to encrypt the payload from a third client signal in the third bitstream such that the encryption module 116 may fully encrypt the payload from each respective client signal.

In some embodiments, the encryption module 116 may use a different number of padding bits depending on the employed encryption model. As specified previously, the encryption module 116 may employ an AES 256 encryption model which may require the use and encryption of a number of padding bits along with the payload from a client signal such that the total number of encrypted bits is a multiple of 256 bits. However, the number of padding bits used and encrypted may depend on the encryption key that may be used by the encryption model which may be a 128-bit encryption key, 256-bit encryption key, 512-bit encryption key, etc.

In these and other embodiments, the encryption module may transmit a bitstream which may include the encrypted bits comprising the payload and a number of encrypted padding bits or transmit multiple bitstreams which may include the encrypted bits comprising the payload for each bitstream along with a number of encrypted padding bits from each bitstream to, for example, a ZR framing module 118.

In some embodiments, the system 110 may include a ZR framing module 118 configured to package a bitstream or a number of bitstreams into a ZR frame or into multiple ZR frames. The ZR framing module 118 may be configured to receive a bitstream or multiple bitstreams from the encryption module 116. The ZR framing module 118 may additionally be configured to create a frame compatible with a ZR operating agreement from the bitstream or bitstreams (e.g., an OpenZR+ operating agreement).

Figure 2A:
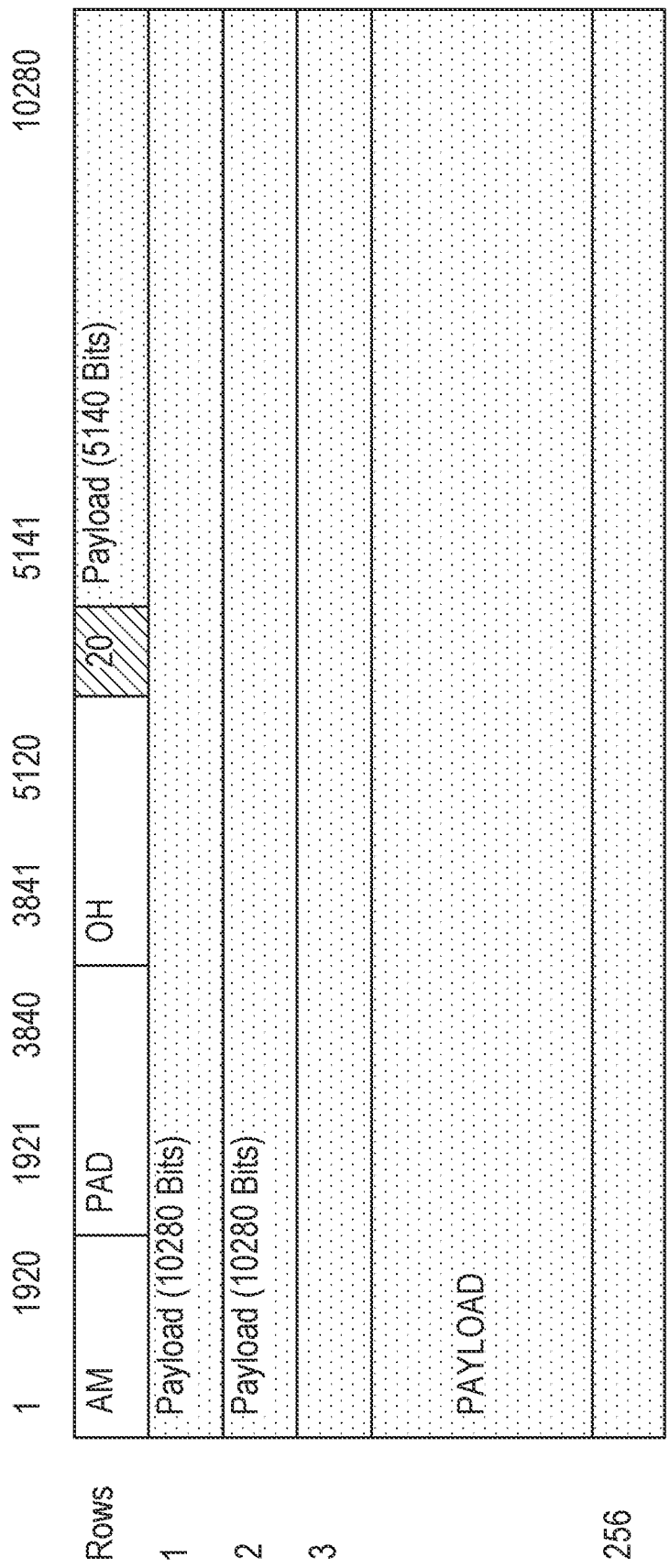
FIG. 2A is an example ZR400 frame that may be encrypted by using the encryption operations illustrated and described in FIGS. 1A and 1B.

For example, a frame compatible with a ZR operating agreement may include the payload sent from the encryption module 116 and a number of non-payload bits. The payload may include bits onto which client data was mapped. The number of non-payload bits may include padding bits, overhead bits, alignment markers, and other non-payload bits. The number of non-payload bits may also include the number of padding bits encrypted along with the payload by the encryption module 116. An example embodiment of a frame compatible with a ZR operating agreement is shown in FIG. 2A. FIG. 2A illustrates an example OpenZR+ frame which may include a number of bits associated with a client signal transmitted at a data rate of 400G. FIG. 2A illustrates the payload along with a number of non-payload bits. The payload in FIG. 2A includes 2,626,540 bits which is a multiple of 257 bits and may be compatible with a ZR operating agreement. Furthermore, FIG. 2A illustrates bits indicating alignment markers ("AM"), overhead bits ("OH"), padding bits ("PAD"), and 20 bits illustrating the number of padding bits encrypted along with the payload by encryption module 116. As described in further detail above, the padding bits combined with the payload is equal to a multiple of 256 bits which may allow the encryption module 116 using a 256-bit encryption key to fully encrypt the payload.

Figure 1C:
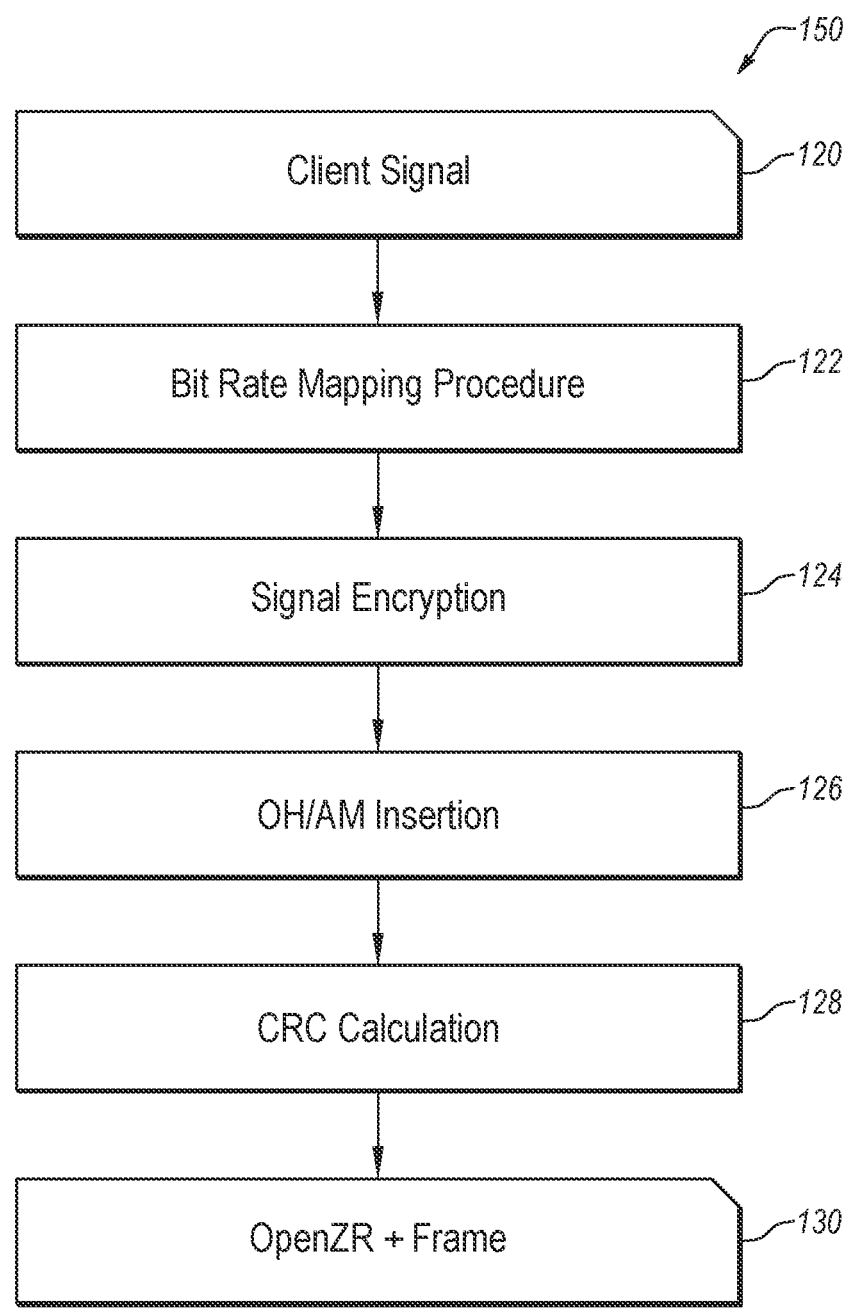
FIG. 1C illustrates example encryption operations that may be performed on sub-400G Ethernet signals.

In some embodiments, the ZR framing module may transmit the frame compatible with a ZR operating agreement to the ZR Network 106 as described in further detail above. FIG. 1C illustrates encryption operations 150 that may be performed on sub-400G Ethernet signals, according to one or more embodiments in this disclosure. The encryption operations 150 may be performed by a system that may be configured to carry a client signal 120. The client signal 120 may include an Ethernet signal which may contain client data. The client signal 120 may include client data which may be transmitted on a number of different data rates under 400G. For example, the client signal 120 may include a data rate of 100G, 200G, 300G etc.

In these and other embodiments, one or more of the modules in FIG. 1B may be configured to perform the encryption operations 150 herein described in FIG. 1C including the signal processing modules 112a-c, time slot module 114, encryption module 116, and ZR framing module 118.

In these and other embodiments, the data from the client signal 120 may be mapped at a bit rate mapping procedure block 122 at which operations may be performed to map the data from the client signal 120 onto a bitstream. For example, any suitable mapping procedure (e.g., GMP ("Generic Mapping Procedure") that may map data from the client signal 120 onto a bitstream may perform the operations at the bit rate mapping procedure block 122. The operations performed at the bit rate mapping procedure block 122 may be performed, for example, by the signal processing modules 112a-c in FIG. 1B. Operations may be performed at the bit rate mapping procedure block 122 that may map data from the client signal 120 onto a bitstream that may be compatible with a ZR operating agreement. For example, the bitstream may include a payload and a number of non-payload bits which may include padding bits.

In some embodiments, the bitstream which may have been mapped at the bit rate mapping procedure block 122 may then be encrypted at a signal encryption block 124. Encryption operations may be performed at the signal encryption block 124 that may encrypt the payload by combining and additionally encrypting a number of padding bits such that the encryption operations performed at the signal encryption block 124 may use a suitable encryption model to fully encrypt the payload (e.g., (AES256)). The processes performed at the signal encryption block 124 may be performed, for example, by the encryption module 116 in FIG. 1B. For example, the encryption processes performed at the signal encryption block 124 may, therefore, use and encrypt a number of padding bits along with the payload such that the number of encrypted bits may be a multiple of 256 bits to encrypt the bitstream with an AES 256 encryption model. The use of a number of padding bits may allow for full encryption of the payload.

In these and other embodiments, the encryption operations 150 configured to encrypt a sub-400G Ethernet signal may include an OH/AM insertion block 126. The operations performed at the OH/AM insertion block 126 may include adding a number of bits which may include information about the data or its transmission. For example, OH in this and other embodiments is meant to describe the signal overhead which may include a number of non-payload bits associated with transmission. AM, as used in this and other embodiments, is meant to describe alignment markers associated with data transmission. In some embodiments, the padding bits used and encrypted along with the payload at the signal encryption block 124 may be included in the OH/AM bits designated at the OH/AM insertion block 126. The operations performed at the OH/AM insertion block 126 may be performed, for example, by the ZR framing module 118 described in FIG. 1B.

In some embodiments, the encryption operations 150 that may be performed on a sub-400G Ethernet signal may include a CRC calculation block 128. As described herein, the operations performed at the CRC calculation block 128 may include any suitable error and/or redundancy check (e.g., ("cyclic redundancy check") wherein the CRC calculation block 128 may check for redundancies and other errors in order that the bitstream may be corrected prior to packaging the bitstream onto an OpenZR+ frame 130. The operations performed at the CRC calculation block 128 may be performed, for example, by the ZR framing module 118 described in FIG. 1B.

Figure 2B:
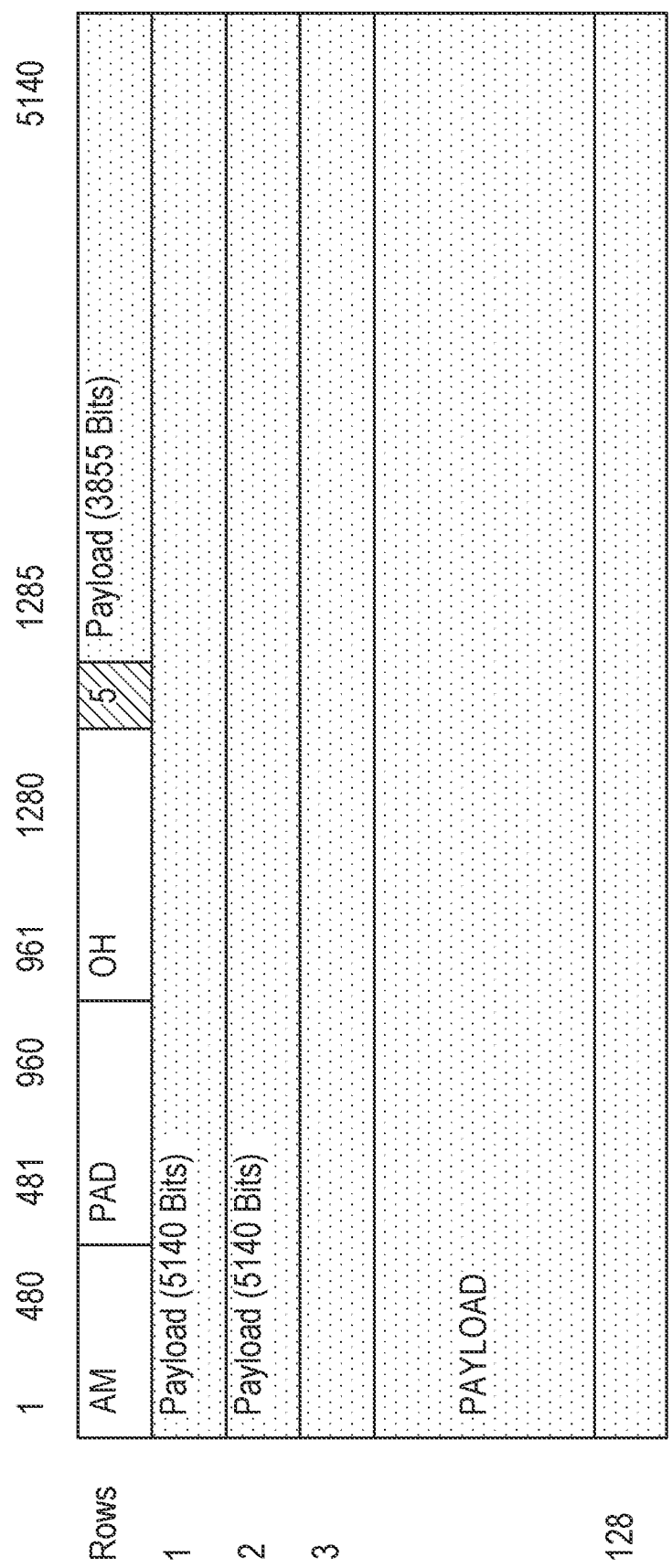
FIG. 2B is an example ZR100 frame that may be encrypted by using the encryption operations illustrated and described in FIGS. 1A-1C.

In these and other embodiments, the encryption operations 150 that may be performed on a sub-400G Ethernet signal may include a system configured to perform the encryption operations 150 that may include an OpenZR+ frame 130. The OpenZR+ frame 130 may include a payload which may include the payload mapped at the bit rate mapping procedure block 122 and encrypted at the signal encryption block 124. The OpenZR+ frame 130 may also include a number of overhead bits which may include the padding bits used and encrypted along with the payload at the signal encryption block 124 and the OH/AM bits added at the OH/AM insertion block 126. The OpenZR+ frame 130 may be generated by a ZR framing module 118 such that the OpenZR+ frame may be compatible with an OpenZR+ operating agreement. An example embodiment of a frame compatible with a ZR operating agreement with a sub-400G client signal is shown in FIG. 2B. FIG. 2B illustrates an example OpenZR+ frame which may include a number of bits associated with a client signal transmitted at a 100G data rate. FIG. 2B illustrates the payload and a number of non-payload bits. The payload in FIG. 2B includes 127 rows of 5,140 bits and one row of 3,855 bits for a total of 656,635 bits which is a multiple of 257 bits and may be compatible with a ZR operating agreement. Furthermore, FIG. 2B illustrates bits indicating alignment markers ("AM"), overhead bits ("OH"), padding bits ("PAD"), and 5 bits illustrating a number of padding bits used and encrypted along with the payload at the signal encryption block 124 such that the total number of encrypted bits at the encryption block 124 is 656,640 bits—a multiple of 256 bits. As described in further detail above, the padding bits combined with the payload is equal to a multiple of 256 bits which may allow the encryption module 116, using a 256-bit encryption key, to fully encrypt the payload.

Figure 1D:
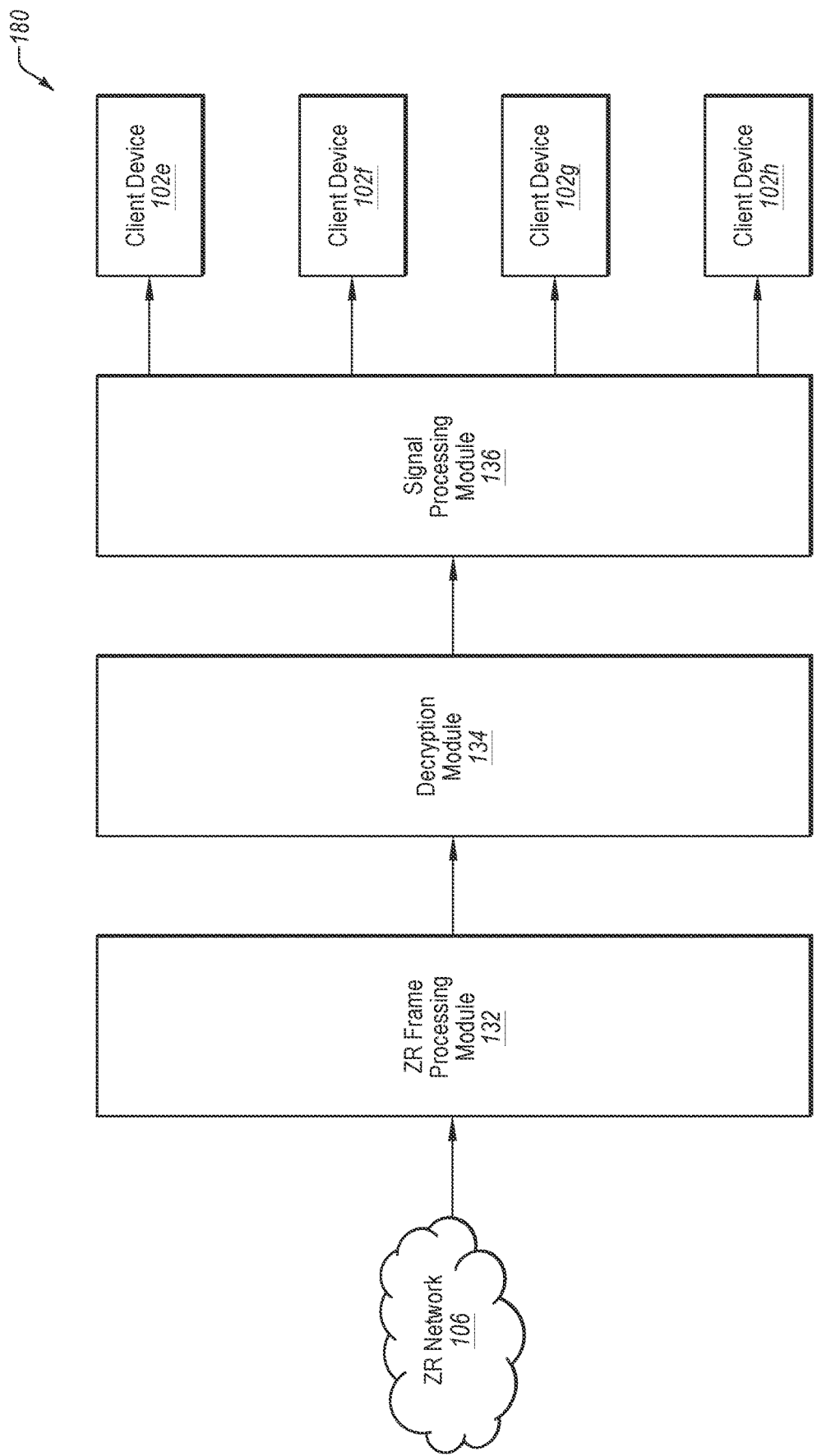
FIG. 1D illustrates an example embodiment of a system configured to perform decryption operations.

FIG. 1D illustrates a system 180 configured to perform decryption operations according to one or more embodiments of the present disclosure. The system 180 may be capable of performing decryption operations on data from one or more client signals from client devices 102, shown in FIG. 1A. The system 180 may be the same as system 110 which may be configured to additionally encrypt client data as shown in FIG. 1A.

FIG. 1D includes descriptions of various modules that may be configured to perform operations. One or more of the modules may include code and routines configured to enable a computing system to perform one or more operations described therewith. Additionally or alternatively, one or more of the modules may be implemented using hardware including a processor, a microprocessor (e.g., to perform or control performance of one or more operations), a field-programmable gate array (FPGA), or an application-specific integrated circuit (ASIC). In some other instances, one or more of the modules may be implemented using a combination of hardware and software. In the present disclosure, operations described as being performed by a respective module may include operations that the respective module may direct a corresponding system to perform. Further, although modules are described separately, such separation may be a logical separation to help facilitate the description of different operations that may be performed by the system of FIG. 1D. As such, particular implementations of the modules may be such that they are integrated into the same module or distributed in a different manner than illustrated or explained.

In the example of FIG. 1D, the system 180 may include a ZR network 106. The ZR network 106 may transmit client data that may be a part of a ZR frame that may be compatible with a ZR operating agreement. The ZR frames may have been received from the ZR framing module 118 as shown in FIG. 1A. The ZR network may then transmit the ZR frames to the ZR frame processing module 132.

In these and other embodiments, the system 180 configured to perform decryption operations may include a ZR frame processing module 132. The ZR frame processing module 132 may be configured to receive the ZR frame containing client data from the ZR network 106. The ZR frame may be compatible with a ZR operating agreement and may further contain a payload including client data and a number of non-payload bits. As described further above and illustrated in FIGS. 2A and 2B, the number of non-payload bits may include padding bits, overhead bits, alignment markers, and other non-payload bits. The number of non-payload bits may also include the number of padding bits encrypted along with the payload by the encryption module 116 as illustrated in FIG. 1A, for example.

In some embodiments, the ZR frame processing module 132 may be configured to receive information from the bits in the ZR frame that may allow for decryption of the payload. For example, the overhead bits in the ZR frame may indicate the information that may be used for the setup of any suitable communication channel (e.g., a frame communication channel "FCC"). The FCC may be used to allow the ZR frame processing module 132 to receive any suitable key exchange protocol, for example Internet Key Exchange "IKE" protocols, Transport Layer Security "TLS" protocols, or any similar key exchange protocol that would allow the system 180 to use a correct decryption model in order to decrypt the payload in the ZR frame. The overhead bits may further include a number of reserved bits which may include an initialization vector and other encryption related data that would allow for secure transmission of client data and that may allow the system 180 to decrypt the payload. Additionally or alternatively, the ZR frame processing module 132 may be configured to transmit the frame received from the ZR network 106 to a decryption module 134.

In some embodiments, the system 180 configured to perform decryption operations may include a decryption module 134 that may be configured to decrypt the payload from the ZR frame. In these and other embodiments, the decryption module 134 may use the information received by the ZR frame processing module 132 from the ZR frame overhead to decrypt the payload. For example, the ZR frame processing module 132 may have received information from the FCC and initialization vector that may allow the decryption module 134 to correctly decrypt the payload. The decryption module 134 may then be configured to use any suitable decryption model which may include any suitable decryption key to decrypt the payload. In some embodiments, the payload may have been encrypted along with a number of padding bits as described in detail in FIG. 1B. In the example embodiment described in FIG. 1B, the encryption module 116 may have used an AES 256 encryption model to encrypt the payload. In order to fully encrypt the payload, the encryption module 116 may have additionally encrypted a number of padding bits along with the payload such that the total number of encrypted bits is a multiple of 256 bits. Correspondingly, the decryption module 134 may use a decryption model that may use a 256-bit key. The decryption model 134 may then decrypt the payload along with the number of padding bits encrypted by the encryption module 116 as illustrated in FIG. 1B above in order that it may fully, and correctly, decrypt the payload.

Additionally or alternatively, the decryption module 134 may be configured to separate the payload from the non-payload bits in the ZR frame. For example, the ZR frame illustrated in FIG. 2A illustrates that the ZR frame for a client signal transmitted at a 400G data rate may include a payload comprising 2,626,540 bits. The ZR frame may additionally include a number of non-payload bits which, in the example FIG. 2A, the ZR frame additionally contains 5,140 non-payload bits which may include bits describing the signal overhead, alignment markers, padding bits including the number of padding bits that may have been encrypted and decrypted along with the payload. In the example ZR frame in FIG. 2A, the decryption module 134 may separate the 5,140 non-payload bits from the decrypted payload. The decryption module 134 may then be configured to discard those non-payload bits prior to transmitting the payload to a signal processing module 136. The decrypted payload may then be provided to the signal processing module 136.

In some embodiments, the signal processing module 136 may be configured to process the decrypted payload such that the information included therein may be transmitted, via one or more client signals (e.g., one or more Ethernet signals), to one or more of client devices 102*e-h*. For example, the signal processing module 136 may generate one or more client signals that each include data from the payload that is designated for transmission to a respective one of the client devices 102*e-h*. In some embodiments, the client devices 102*e-h* may be any of the client devices 102 listed in FIG. 1A or another client device configured to receive a transmission of the payload from the signal processing module 136.

In some embodiments, the decrypted payload may have data from different clients segregated by time slots that may have been apportioned by the time slot module 114 in FIG. 1A. For example, a decrypted payload may include first data designated for the client device 102*e*, second data designated for the client device 102*f*, third data designated for the client device 102*g*, and fourth data designated for the client device 102h. In some embodiments, the differentiation between the first data, the second data, the third data, and the fourth data may be indicated by the alignment markers. The signal processing module 136 may be configured to separate and transmit the bits to the respective client devices. For example, the first data may be transmitted to client device 102e via a corresponding first client signal, the second data may be transmitted to client device 102f via a corresponding second client signal, the third data may be transmitted to client device 102g via a corresponding third client signal, and the fourth data may be transmitted to client device 102h via a corresponding fourth client signal.

In these and other embodiments, the client devices 102 may include any suitable system, apparatus, or device, configured to receive a client optical Ethernet signal. For example, in some embodiments, each of one or more of the client devices 102 may be a router configured to receive the communication of an optical Ethernet signal. For instance, the optical Ethernet signals that may be received by the client devices may include a 100G signal, a 200G signal, a 300G signal, or a 400G signal. The client devices 102 may include any suitable arrangement of electrical, optical, and/or electro-optical components and hardware configured to perform the operations described. Further, the client devices 102 may include any suitable computing system such as the computing system described below with respect to FIG. 4.

Figure 3:
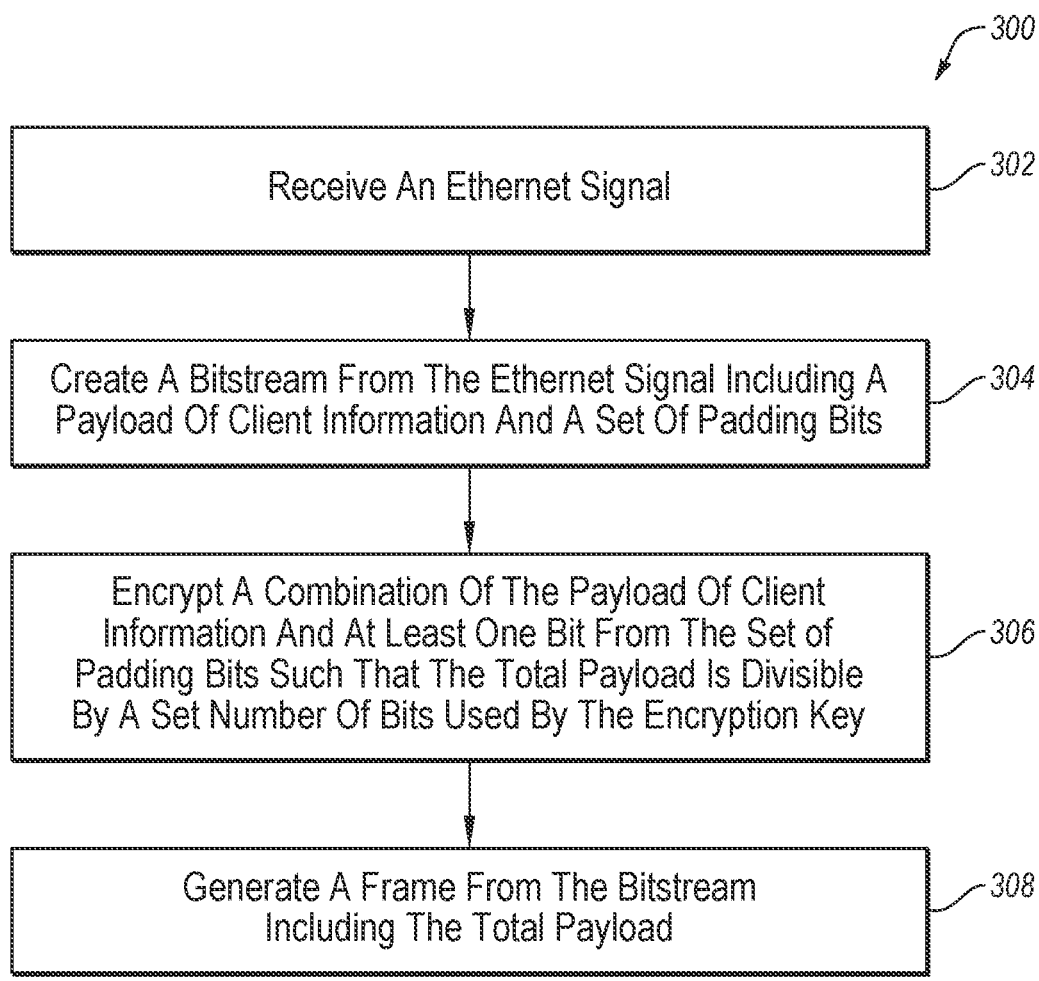
FIG. 3 is a flow chart of an example method of encrypting a ZR signal.

FIG. 3 illustrates an example flow chart of an example method 300 of encrypting client data for a ZR signal. The method 300 may be implemented by any suitable element of an optical system such as the optical system 100 of FIG. 1A as described above. Although illustrated as discrete steps, various steps of the method 300 may be divided into additional steps, combined into fewer steps, or eliminated, depending on the desired implementation. Additionally, the order of performance of the different steps may vary depending on the desired implementation.

In some embodiments, the method 300 may begin at block 302. At block 302, an Ethernet signal may be received. For example, the Ethernet signal may be the same or similar to the Ethernet signals described in FIGS. 1A-1D. Additionally or alternatively, the Ethernet signal may be received from one or more client devices like those described in FIG. 1A. The Ethernet signal received may have a data rate. In some embodiments, more than one Ethernet signal may be received. Each of the respective Ethernet signals may have a different data rate (e.g., 10G, 200G, 300G, 400G, 800G etc.). For example, a first Ethernet signal may have a first data rate of 100G, a second Ethernet signal may have a second data rate of 200G, a third Ethernet signal may have a third data rate of 300G, a fourth Ethernet signal may have a fourth data rate of 400G as described above in FIGS. 1A-C.

In these and other embodiments, any suitable device may be used to receive the Ethernet signal at block 302. For example, the transport device 104 described and illustrated in FIG. 1A or another device configured to perform the operations described in one of the signal processing modules 112 as described and illustrated in FIG. 1B.

At block 304, a bitstream may be created from the Ethernet signal wherein the bitstream may include a payload of client information and a set of padding bits. For example, the Ethernet signal may be mapped onto a bitstream using any suitable mapping procedure (e.g., GMP ("Generic Mapping Procedure)) that may, for example, map data from the client signals onto a bitstream as described in FIGS. 1A-1C. Additionally or alternatively, the bitstream mapped from the client data in the received Ethernet signal may be compatible with a ZR operating agreement (i.e., an OpenZR+ operating agreement).

At block 306, a combination of the payload of client information and at least one bit from the set of padding bits may be encrypted together such that the total number of encrypted bits is divisible by a set number of bits used by the encryption key. For example, as described in FIGS. 1A-C, an AES 256 encryption model may be used to encrypt the payload. In order to fully encrypt the payload, at least one padding bit may be added to the payload in order that the total number of bits that may be encrypted may be a multiple of 256. In some embodiments, the number of padding bits added to the bitstream may be dependent on the encryption model that may be used and the encryption key that may be employed by the encryption model.

At block 308, a frame may be generated from the bitstream which may include the total number of encrypted bits. For example, the frame may be generated by any applicable device or system configured to generate the frame like, for example, the transfer device 104 in FIG. 1A or any suitable device configured to perform the operations as outlined by the ZR framing module 118 in FIG. 1B. Additionally or alternatively, the frame generated may be compatible with an applicable ZR operating agreement (i.e., an OpenZR+ operating agreement). Furthermore, the generated frame that may be compatible with a ZR operating agreement may include the payload and a number of non-payload bits. The payload may include bits onto which client data was mapped. The number of non-payload bits may include padding bits, overhead bits, alignment markers, and other non-payload bits. The number of non-payload bits may also include the number of padding bits encrypted along with the payload as described at block 306 and in FIGS. 1A-1C. Example frames that may be compatible with a ZR operating agreement are illustrated in FIGS. 2A and 2B.

Modifications, additions, or omissions may be made to the method 300 without departing from the scope of the present disclosure. For example, the outlined steps and operations are only provided as examples, and some of the steps and operations may be optional, combined into fewer steps and operations, or expanded into additional steps and operations without detracting from the essence of the disclosed embodiments.

FIG. 4 illustrates a block diagram of an example computing system 402, according to at least one embodiment of the present disclosure. The computing system 402 may be configured to implement or direct one or more suitable operations described in the present disclosure. For example, the computing system 402 may be used in various elements of the above disclosure (e.g., client devices 102, transport devices 104, signal processing modules 112, time stamping module 114, encryption module 116, ZR signal processing module 118, etc.). In some embodiments, the computing system 402 may be used to control operations related to encrypting or decrypting ZR signals. The computing system 402 may include a processor 450, a memory 452, and a data storage 454. The processor 450, the memory 452, and the data storage 454 may be communicatively coupled.

In general, the processor 450 may include any suitable computer, computing entity, or processing device including various computer hardware or software modules and may be configured to execute instructions stored on any applicable computer-readable storage media. For example, the processor 450 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, the processor 450 may include any number of processors configured to, individually or collectively, perform or direct performance of any number of operations described in the present disclosure. Additionally, one or more of the processors may be present on one or more different electronic devices, such as different servers.

In some embodiments, the processor 450 may be configured to interpret and/or execute program instructions and/or process data stored in the memory 452, the data storage 454, or the memory 452 and the data storage 454. In some embodiments, the processor 450 may fetch program instructions from the data storage 454 and load the program instructions in the memory 452. After the program instructions are loaded into memory 452, the processor 450 may execute the program instructions.

The memory 452 and the data storage 454 may include computer-readable storage media for carrying or having computer-executable instructions or data structures stored thereon. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other non-transitory storage medium which may be used to store particular program code in the form of computer-executable instructions or data structures and which may be accessed by a general-purpose or special-purpose computer. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007).

Combinations of the above may also be included within the scope of computer-readable storage media. Computer-executable instructions may include, for example, instructions and data configured to cause the processor 450 to perform a certain operation or group of operations.

Modifications, additions, or omissions may be made to the computing system 402 without departing from the scope of the present disclosure. For example, in some embodiments, the computing system 402 may include any number of other components that may not be explicitly illustrated or described.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   receiving an Ethernet signal;
   creating a bitstream from the Ethernet signal comprising a payload of client information and a set of padding bits;
   encrypting, using an encryption scheme with an encryption key including a length of a set number of bits, a total payload, the total payload including, prior to being encrypted, a combination of the payload of client information and a number of padding bits from the set of padding bits, the number of padding bits included in the total payload being determined based on the length of the encryption key such that a total number of bits of the total payload is divisible by the set number of bits; and
   generating a frame from the bitstream comprising the total payload, wherein the frame including both the total payload and a remainder of the set of padding bits is an OpenZR+ frame.

2. The method of claim 1, wherein the encryption scheme used to encrypt the total payload is an Advanced Encryption Scheme with a 256-bit implementation (AES256).

3. The method of claim 1, wherein the Ethernet signal is a sub-400 gigabyte Ethernet signal.

4. The method of claim 1, wherein the frame further comprises alignment markers, time stamps, and overhead bits associated with the total payload.

5. The method of claim 1, further comprising communicating an initialization vector and other encryption key exchange information through a communication channel via a set of overhead bits from the frame.

6. The method of claim 1, further comprising:
decrypting the total payload using a decryption key corresponding to the encryption key for the set number of bits.

7. The method of claim 1, wherein encrypting the total payload of the bitstream occurs after a time slot has been applied to the bitstream.

8. The method of claim 1, wherein encrypting the total payload of the bitstream occurs prior to an alignment marker being applied to the bitstream.

9. The method of claim 1, wherein encrypting the total payload of the bitstream occurs prior to a cyclic redundancy check being applied to the bitstream.

10. A system comprising:
a first transport device configured to perform first operations, the first operations comprising:
receiving an Ethernet signal;
creating, from the Ethernet signal, a bitstream comprising a first payload of client information, a second payload of client information, and a set of padding bits;
encrypting, using an encryption scheme with an encryption key including a length of a set number of bits, a first total payload including, prior to being encrypted, a combination of the first payload of client information and at least one bit from the set of padding bits such that a first total number of bits of the first total payload is divisible by the set number of bits;
encrypting, using the encryption scheme, a second total payload including, prior to being encrypted, a combination of the second payload of client information and at least one bit from the set of padding bits such that a second total number of bits of the second total payload is equal to the first total number of bits of the first payload and is divisible by the set number of bits; and
generating a first frame out of the bitstream comprising the first total payload and a second frame out of the bitstream comprising the second total payload, wherein the first frame including both the first total payload and a remainder of the set of padding bits is an OpenZR+ frame.

11. The system of claim 10, wherein the encryption scheme used to encrypt the first total payload and the second total payload is an Advanced Encryption Scheme with a 256-bit implementation (AES256).

12. The system of claim 10, wherein the Ethernet signal is a 400 Gigabyte or higher Ethernet signal.

13. The system of claim 10, wherein the set of padding bits comprises alignment markers, time stamps, and overhead bits associated with the first total payload, the second total payload, the first frame, and the second frame.

14. The system of claim 10, wherein the remainder of the set of padding bits is used to communicate an initialization vector and other encryption key exchange information through a communication channel.

15. The system of claim 10, further comprising:
a second transport device configured to perform second operations, the second operations comprising:
receiving the bitstream comprising the first total payload and the second total payload; and
decrypting the first total payload and the second total payload using a decryption key corresponding to the encryption key for the set number of bits.

16. The system of claim 10, wherein encrypting the first total payload of the bitstream occurs after a first time slot has been applied to the bitstream.

17. The system of claim 10, wherein encrypting the first total payload of the bitstream occurs prior to an alignment marker market being applied to the bitstream.

18. The system of claim 10, wherein encrypting the first total payload of the bitstream occurs prior to a cyclic redundancy check is applied to the bitstream.

* * * * *